(12) United States Patent
Gotoh

(10) Patent No.: US 6,494,501 B2
(45) Date of Patent: Dec. 17, 2002

(54) PIPE CONNECTOR, PIPE-CONNECTING STRUCTURE, AND CONNECTING METHOD

(75) Inventor: Yuuichi Gotoh, Owariasahi (JP)

(73) Assignees: Nippon Electronics Technology Co., LTD, Aichi (JP); Kyokutoh Industry, Ltd., Aichi (JP); Tsukamoto Kuchosetsubi, Ltd., Aichi (JP)

(*) Notice: Subject to any disclaimer, the term of this patent is extended or adjusted under 35 U.S.C. 154(b) by 0 days.

(21) Appl. No.: 09/858,120

(22) Filed: May 15, 2001

(65) Prior Publication Data

US 2002/0014771 A1 Feb. 7, 2002

(30) Foreign Application Priority Data

May 1, 2000 (JP) .......................... 2000-147896

(51) Int. Cl.7 .......................... F16L 17/00; F16L 19/00; F16L 21/02
(52) U.S. Cl. .................. 285/371; 285/21.3; 285/285.1; 285/294.1; 285/331; 285/335; 285/354; 285/373; 285/398; 285/915
(58) Field of Search .................. 285/371, 335, 285/373, 398, 331, 915, 21.3, 285.1, 294.1, 354

(56) References Cited

U.S. PATENT DOCUMENTS

| | | | | |
|---|---|---|---|---|
| 269,011 A | * | 12/1882 | Clatworthy | 285/294.1 |
| 283,972 A | * | 8/1883 | Converse | 285/294.1 |
| 283,973 A | * | 8/1883 | Converse | 285/294.1 |
| 1,762,766 A | * | 6/1930 | Garay | 285/331 |
| 1,921,642 A | * | 8/1933 | Stephenson | 285/331 |
| 2,498,831 A | * | 2/1950 | Veitch | 285/21.1 |
| 2,669,465 A | * | 2/1954 | Newell | 285/53 |
| 3,233,925 A | * | 2/1966 | Stevens | 285/340 |
| 3,387,864 A | * | 6/1968 | Walters | 285/23 |
| 3,473,833 A | * | 10/1969 | Bremer | 285/285.1 |
| 3,971,574 A | * | 7/1976 | Curtin | 285/31 |
| 4,047,743 A | * | 9/1977 | Weintraub et al. | 285/148.28 |
| 4,072,328 A | * | 2/1978 | Elliott | 285/169 |
| 4,137,117 A | * | 1/1979 | Jones | 156/294 |
| 4,256,333 A | * | 3/1981 | Jones | 285/22 |
| 4,690,434 A | * | 9/1987 | Schmidt | 285/31 |
| 4,896,904 A | * | 1/1990 | Gadsden et al. | 285/381 |
| 4,941,693 A | * | 7/1990 | Sapude et al. | 285/331 |
| 5,584,512 A | * | 12/1996 | Cartensen | 285/55 |

FOREIGN PATENT DOCUMENTS

SU   1657826 A1 * 6/1991 .................. 285/371

* cited by examiner

*Primary Examiner*—Robert J. Sandy
*Assistant Examiner*—Carlos Lugo
(74) *Attorney, Agent, or Firm*—Knobbe Martens Olson & Bear LLP (57) ABSTRACT

A pipe joint connecting a pipe using an anaerobic adhesive, which possesses a double pipe structure formed with an inner pipe fitting into the inner circumference side of the end of the pipe, and an outer pipe fitting into the outer circumference side of the end of the pipe, integrated with a gap between them, and a tapered surface formed with at least one or the other of the inner piper or outer pipe approaching the other; and a pleated O-ring provided on the end of the outer pipe to set the pipe in place by tightening an O-ring locking material supported by the outer pipe.

12 Claims, 12 Drawing Sheets

PIPE CONNECTOR, PIPE-CONNECTING STRUCTURE, AND CONNECTING METHOD

BACKGROUND OF THE INVENTION

1. Field of the Invention

The present invention relates to a pipe joint, a pipe connection structure possessing the structure of the pipe joint, and a method for connecting the joint and a pipe. It particularly relates to a pipe joint, for which execution of work is simple and high airtightness and reliability can be achieved without using a flame.

2. Description of the Related Art

Conventionally, for connecting a joint for metal piping and a metal pipe, metal O-ring crimping or blazing, etc., which are used for transmitting a pressurized gas or fluid through, have been used.

Particularly, in the case of piping for coolant for an air conditioner, because high-temperature and high-pressure gas needs to be maintained in complete airtightness for a long period of time, a highly reliable brazing method has been used. The brazing method, however, has problems such that it can be used only by gas welding technicians because a flame is used, and special skills are required. In recent years, to improve safety inside work sites for piping, using a flame is starting to be avoided.

Figure 11:
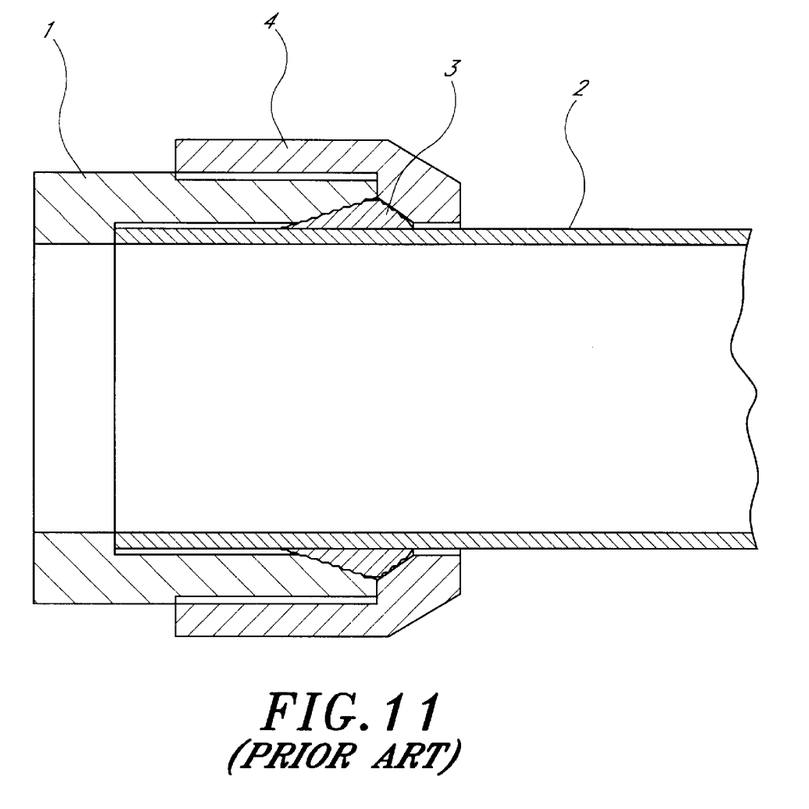
FIG. 11 shows a cross section of a conventional piping connection structure.

For this reason, in place of brazing, a metal O-ring crimping method has been adopted in many places. By the joint structure of the metal O-ring crimping method, as shown in FIG. 11, the airtightness and pressure resistance of piping are achieved by: squeezing a wedge-shaped O-ring 3 into a gap provided between a pipe joint 1 and a metal pipe 2 using strong pressure, and bending and deforming the metal O-ring 3 in a direction of the inner diameter by fixing and tightening the O-ring with a cap nut 4, and at the same time letting it cut into the pipe joint 1 and the metal pipe 2.

SUMMARY OF THE INVENTION

The pipe connection structure of the above-mentioned metal O-ring crimping method, however, has a problem that great force is required for the work. Particularly, in the case of piping with large bore sizes, because working tools become large, it is difficult to work in a small indoor site. Additionally, as indicated by the facts that connection of a metal pipe joint and a pipe, which requires complete airtightness, conventionally has been done by brazing, it can be said that achieving complete airtightness by the metal O-ring crimping method is difficult due to its structure.

The present invention was accomplished in consideration of the above-mentioned situation. One of its objects is to provide a structure and method for connecting a pipe joint and a pipe without using a flame, which can achieve airtightness and reliability equal to those achieved by the brazing method, as well as excellent workability.

The first embodiment of the present invention to achieve the above-mentioned objects is a pipe joint for connecting a pipe using an anaerobic adhesive. This embodiment is characterized in that it has a double pipe structure and a tapered surface. The double pipe structure is formed with an inner pipe fitting into the inner circumference of the pipe end integrated with an outer pipe fitting into the outer circumference of the pipe end. The tapered surface is formed with at least one of the inner pipe or the outer pipe approaching the other.

The second embodiment of the present invention is the pipe joint described in the first embodiment. This embodiment is characterized in that it has a cap with a tube portion, a lid portion, an adhesive-filling slit and an air escape slit. The tube portion is inserted in a gap provided between the inner pipe and the outer pipe. The lid portion covers one end of the tube portion. The adhesive-filling slit is formed on the tube portion and linked with the gap. The air escape slit is formed on the tube portion and linked with the gap.

The third embodiment of the present invention is a structure for connecting a pipe using an anaerobic adhesive. This embodiment is characterized in that it has a double pipe structure and a tapered surface. The double pipe structure is formed with an inner pipe fitting into the inner circumference of the pipe end integrated with an outer pipe fitting into the outer circumference of the pipe end. The tapered surface is formed with at least one of the inner pipe or the outer pipe approaching the other. It is also characterized in that the pipe is fixed by the anaerobic adhesive that is hardened by pressing the pipe end against the tapered surface to narrow a gap between the pipe and the inner pipe or the outer pipe.

The fourth embodiment of the present invention is a method for connecting a pipe. This embodiment is characterized in that a pipe joint with a double pipe structure and a tapered surface is used. The double pipe structure is formed with an inner pipe fitting into the inner circumference of the pipe end integrated with an outer pipe fitting into the outer circumference of the pipe end. The tapered surface is formed with at least one of the inner pipe or the outer pipe approaching the other. It is also characterized in that an anaerobic adhesive is filled in the gap between the pipe and the inner pipe or the outer pipe, and is hardened by narrowing the gap by pressing a pipe into the gap in the pipe joint to push the pipe end against the tapered surface.

The fifth embodiment of the present invention is a pipe joint for connecting a pipe by an adhesive. This embodiment is characterized in that it comprises (1) a main body with a double pipe structure that is formed with an inner pipe fitting into an inner circumference of the pipe end integrated with an outer pipe fitting into the outer circumference of the pipe end with a gap between them, (2) O-rings provided between each end of the outer pipe and the pipe, and (3) O-ring locking materials holding in place the O-rings, which are supported by the outer pipe.

In the sixth embodiment of the present invention, the above-mentioned O-ring is a protruding portion in a circular shape extending in the direction of an inner side of the double structure and possesses a protruding portion to be inserted between the outer circumference of the pipe and the inner circumference of the outer pipe.

Symbols used in drawings are as follows: 10, 40, 50: Pipe joint; 11, 41, 51: Inner pipe; 12, 42, 52: Outer pipe; 13, 43, 53: Tapered surface; 15, 45: Gap; 20: Pipe; 30: Anaerobic adhesive; 100: Cap; 101: Tube portion; 102: Lid portion; 103: Adhesive filling slit; 104: Air escape slit.

DETAILED DESCRIPTION OF THE PREFERRED EMBODIMENT

Because a pipe joint and a pipe connection structure and a connection method according to the present invention comprise joining a pipe to the pipe joint with an anaerobic adhesive, work can be executed without using a flame, improving safety of the work. Additionally, because an anaerobic adhesive is a one-component adhesive, it has field workability and the adhesive's stability is also good. Additionally, because hardening of an anaerobic adhesive accelerates when air is shut off in a small place, work time is shortened as compared with the cases where an adhesive of a solvent type is used.

Additionally, a pipe joint according to the present invention has a structure suitable for using particularly an anaerobic adhesive. In other words, first, it uses a double pipe structure in which an inner pipe and an outer pipe are integrated with a gap between them as a pipe joint, and in the gap, an anaerobic adhesive can be filled. Further, if the anaerobic adhesive is filled in the gap without any conditions to start hardening present, hardening does not start.

Secondly, in the pipe joint according to the present invention, a tapered surface is formed with at least one of the inner pipe or the outer pipe approaching the other. With this structure, a gap suitable for an anaerobic adhesive filled to rapidly harden when a pipe is inserted, can be provided uniformly around the entire circumference of the tip of the pipe joint. When being processed, it is unavoidable that a pipe to be connected and the inner and outer pipes of the pipe joint are distorted from a perfect circle. If the tapered surface is not provided, due to the slight distortion, a gap between the pipe and the inner/outer pipes becomes not uniform. When connecting the pipe with the inner/outer pipes, discrepancies in hardening speed occur in areas around the circumference of the pipe. If this occurs, inconveniences such as outflow of unhardened anaerobic adhesive result. It becomes necessary to keep the pipe and the pipe joint in place until hardening of the entire part is completed, and thus the pipe or the pipe joint is not shifted or vibrated. For this reason, if a structure has a tapered surface formed according to the present invention, slight distortion of the pipe or the pipe joint is corrected with the tip of the pipe being pressed against the tapered surface, forming a uniform gap around the entire circumference. As a result, the anaerobic adhesive completely hardens in all areas continuously and circularly.

Additionally, instead of forming a tapered surface, another way of forming a gap suitable for having an anaerobic adhesive rapidly harden around the entire circumference is to simply narrow the gap between a pipe joint and a pipe by processing. In this case, there are problems such as difficulty in inserting the pipe due to pipe distortion or friction, difficulty in inserting the pipe due to air confined in the gap between an inner pipe and an outer pipe as the result of an air outlet covered by the pipe, and incomplete adhesive hardening halfway through inserting the pipe. As compared with this case, if a tapered surface is formed as in a structure according to the present invention, a pipe can be inserted easily because the gap is large enough until the tip of the pipe contacts the tapered surface. Furthermore, because a uniform gap is formed around the entire circumference of the pipe and the pipe joint in an instant when it is pressed against the tapered surface, an excellent effect that the adhesive hardens in a short period of time is obtained.

Furthermore, in addition to the above, the following effects can be obtained by adopting a double pipe structure: The adhesive is not squeezed out to the inside of the pipe. Drawing-out strength increases due to an increased area for adhering to the pipe. A passage through which substances inside the piping leak out becomes longer, and airtightness improves. The bending strength of the joint improves. Additionally, with a tapered surface formed, when inserting a pipe in the gap, a worker needs to insert it until it contacts the tapered surface, eliminating insertion depth adjustment and providing excellent workability. At the same time, the tip of the pipe inserted is securely fixed by cutting into the tapered surface.

When filling an anaerobic adhesive in the above-mentioned pipe joint according to the present invention, using a proper filling amount is especially important. In other words, if the amount is excessive, when inserting the pipe into the pipe joint, an excess amount starts to flow out to the outside passing through a narrow gap between the pipe and the pipe joint. Because of the overflow, the worker has to push the pipe in with great force for a long period of time. This causes not only poor workability but also causes inconveniences such as flow of the adhesive to the inside of the connected pipe and hardening of the adhesive before the pipe is sufficiently inserted. Above all, it is a waste of the adhesive. If the amount is not sufficient, adhesion strength of joining the pipe and the pipe joint decreases.

In consideration of the above-mentioned problems, as described in the second embodiment, the structure according to the present invention possesses a cap with an adhesive-filling slit and an air escape slit. When the tube portion of the cap is inserted in a gap provided between an inner pipe and an outer pipe of the pipe joint, and an anaerobic adhesive is poured into the gap from the adhesive-filling slit, the adhesive is quickly filled inside the gap while forcing out air inside the gap from the air escape slit. If the adhesive is completely filled inside the gap, it overflows from the air escape slit. Consequently, by setting an insertion depth of the cap's tube portion into the gap in advance so that a proper adhesive amount is filled upon starting of adhesive overflow from the air escape slit, it becomes possible to fill a proper amount each time.

If filling an adhesive into both ends of the pipe joint is necessary, it can be done by fitting caps into both ends, leaving the cap after filling the adhesive into one end, and filling the adhesive into other end by turning the pipe joint the other way around. By doing this, because a lid portion covers the adhesive already filled, it does not spill out. Moreover, by putting on the cap from the beginning, distortion or damaging of the pipe joint can be prevented, preventing a surface to be joined inside the gap from corroding and becoming dirty.

Additionally, the sixth embodiment described above is a pipe joint possessing (1) a main body that has a double pipe structure formed with an inner pipe fitting into the inner side of the end of the pipe and an outer pipe fitting into the outer side of the end of the pipe with a gap between them, (2) O-rings provided between each end of the outer pipe and the pipe, and (3) O-ring locking materials holding in place the O-rings, which are supported by the outer pipe. The O-ring is a protruding portion in a circular shape extending in the direction of an inner side of the double structure and it possess a protruding portion to be inserted between the outer circumference of the pipe and the inner circumference of the outer pipe. According to this embodiment, because the O-ring can securely hold the pipe in place, the tapered surface inside the double pipe structure as described above becomes unnecessary. Because the O-ring also blocks the adhesive, spilling of the adhesive inside the pipe can be prevented.

The above-mentioned pipe joint can be used for various metal piping such as copper piping for various purposes. Particularly, it is effective for connecting metal pipes, which are normally connected by welding. It enables connection exhibiting the same airtightness and pressure resistance as when done by welding without welding the parts together. Connection work is extremely easy and does not require special skills. Because work can be done even in a small place, work efficiency and work costs can be substantially reduced.

An inner pipe is longer than an outer pipe, enabling improvement in airtightness by increasing a contact area for the inner pipe and a pipe to be connected. Preferably, the length of the outer pipe should be approximately ½ to ¾ of that of the inner pipe.

The pipe joint is effective for connecting pipes such as copper coolant piping in which an internal pressure is applied to the pipes. Preferably, a thickness of an inner pipe is thinner than that of a pipe to be connected (or an interval between the inner pipe and an outer pipe). Because of this thickness difference, when internal pressure is applied, it becomes easier for the inner pipe to expand in a centrifugal direction than does the pipe to be connected, and the inner pipe pressurizes an adhesive filled in a gap between the pipe and the inner pipe in the centrifugal direction. This further improves airtightness. A thickness of the inner pipe should be, for example, approximately ½ to ¾ of that of the pipe. Connection can be done suitably if a thickness of a pipe to be connected is, for example, approximately 0.5 to 2 mm (in most cases, 1 to 1.5 mm) and its diameter is, for example, approximately 10 to 80 mm (in most cases 20 to 50 mm).

Materials used for an inner pipe can be selected according to piping used, a material used for a pipe to-be connected, adhesive property, etc. One example of a material is copper. In the case of copper coolant piping, a material is selected in consideration of its stability, pressure resistance (For example, it can withstand internal pressure of approximately 3 MPa.) and thermal resistance (for example, −30° C./−86° F. to 140° C./284°F.). The same material used for a pipe can be used as well. Additionally, an inner pipe and an outer pipe can be manufactured using the same material, but different materials can also be used. When O-rings are attached, material strength should be considered. The O-ring can be integrated with an inner pipe by manufacturing the O-ring using either brass or a resin such as polyimide or poly (phenylenesulfide). The inner pipe and the outer pipe can be integrated using an adhesive.

Any kinds of adhesives with adhesive force suitable for a pipe can be used. Preferably, an anaerobic adhesive that can airtightly join a metal pipe is used. For example, an adhesive, Three Bond 1300 series (manufactured by Three Bond Co.), whose main component is metaacrylate, can be used. Preferably, the adhesive should be tolerant to a temperature range of −40° C./−104° F. to 150° C./302° F. and show longitudinal shear strength of more than 100 Kgf/cm$^2$.

Embodiment 1

Figure 1:
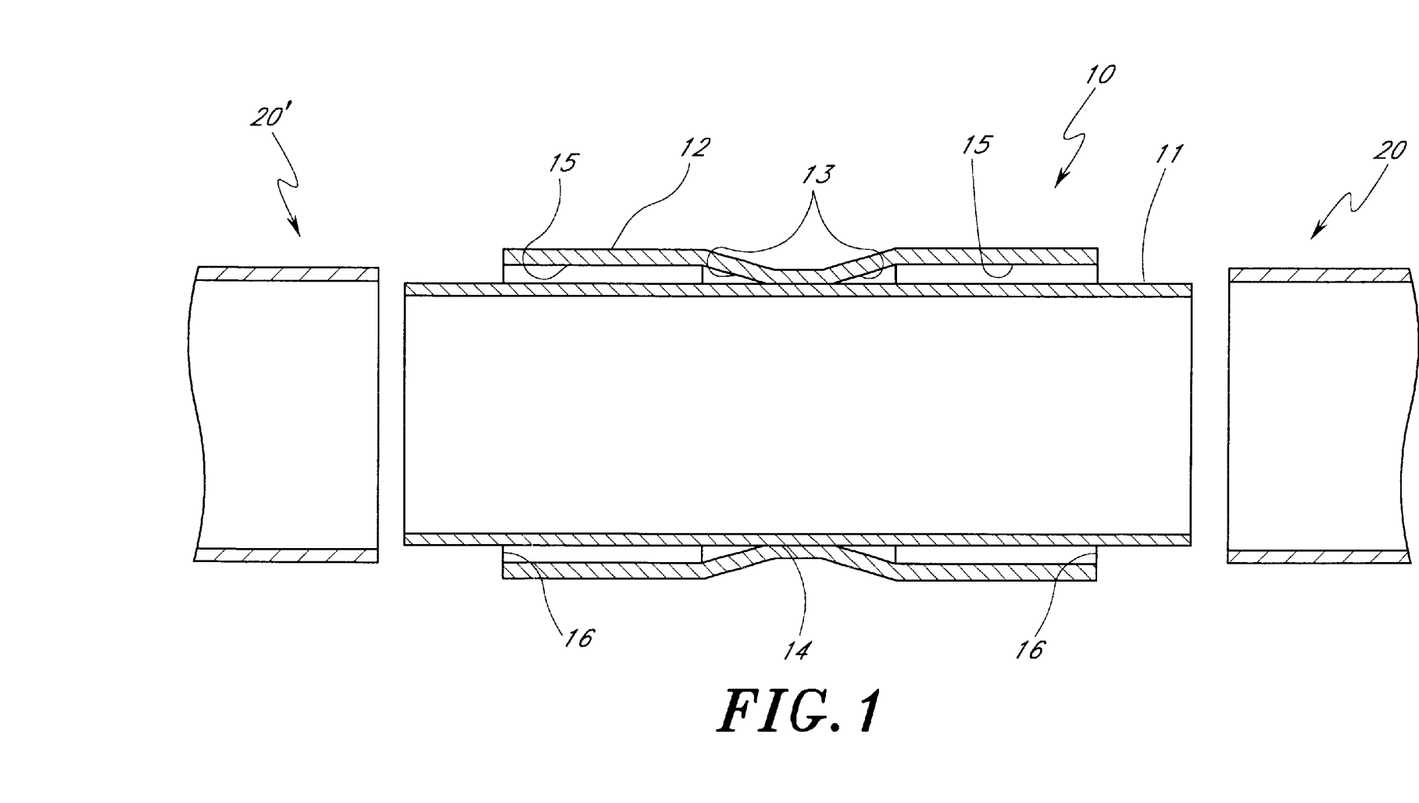
FIG. 1 shows a cross section of a piping connection structure of the first embodiment according to the present invention.

The first embodiment of the present invention is described in the following referring to FIG. 1 to FIG. 4:

FIG. 1 is a cross section of a pipe connection structure of this embodiment. In FIG. 1, a pipe joint 10 is concentrically connected with two pipes 20 and 20' with the same diameter. The pipe joint 10 is formed using a metal material such as iron. It has a double pipe structure, wherein an inner pipe 11 formed on a diameter fitting into the inner circumference side of the end of the pipe 20 and an outer pipe 12 formed on a diameter fitting into the outer circumference side of the end of pipe 20 are overlapped with a gap 15 between them. Additionally, the inner pipe 11 is formed longer than the outer pipe 12 so that both of its ends extend and protrude from the ends of the outer pipe 12 toward the pipes 20 and 20'.

In the middle of the outer pipe 12 in the direction of its length, a circular tapered surface 13 is formed on the inner circumference surface of the outer pipe, which approaches the inner pipe 11. This tapered surface 13 is formed by pressing the outer circumference toward the inner pipe 11. With this tapered surface 13, the inner wall of the outer pipe 12 and the outer wall of the inner piper 11 contact at the middle of each wall in the direction of the length, and at this contact 14, they are integrated by welding or an adhesive. This closes the gap 15 in both openings of the pipe joint 10 and the middle portion is closed in a tapered shape.

Figure 2:
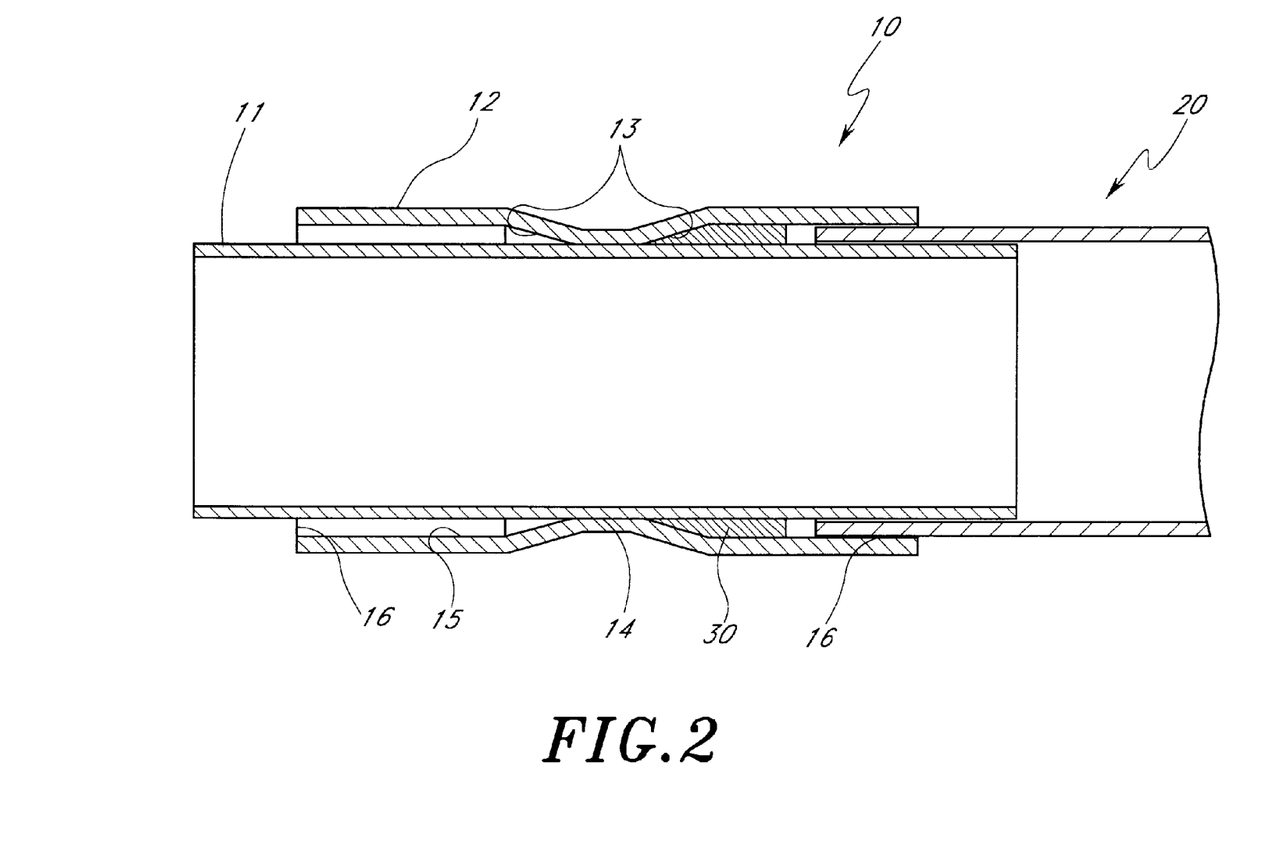
FIG. 2 shows also a cross section of a pipe in the process of connection.

A method for connecting the pipes 20 and 20' with the pipe joint is described in the following: When connecting the pipes 20 and 20', first, a proper amount of an anaerobic adhesive 30 is filled deep inside the gap 15 (inside the center of the pipe joint 10) from one opening 16 of the gap 15 as shown in FIG. 2. In this state, the anaerobic adhesive 30 has not hardened because a large portion of it is in contact with air. Next, the end of the pipe 20 is inserted inside the gap 15 and is fitted in along the outer circumference of the inner pipe 11. The anaerobic adhesive 30 filled inside the gap 15, then, gradually thinly spreads out between the pipe 20 and the inner wall of the gap 15 as if being pushed away by the end of the pipe 20. At this time, as air inside the gap 15 is forced out from the opening 16 by the anaerobic adhesive 30, no bubbles remain in the anaerobic adhesive 30. When the tip of the pipe 20 contacts the tapered surface 13 of the outer pipe 12, the further entrance of the pipe 20 is hampered and the anaerobic adhesive 30 is filled entirely inside the gap 15 (See FIG. 3.).

Figure 3:
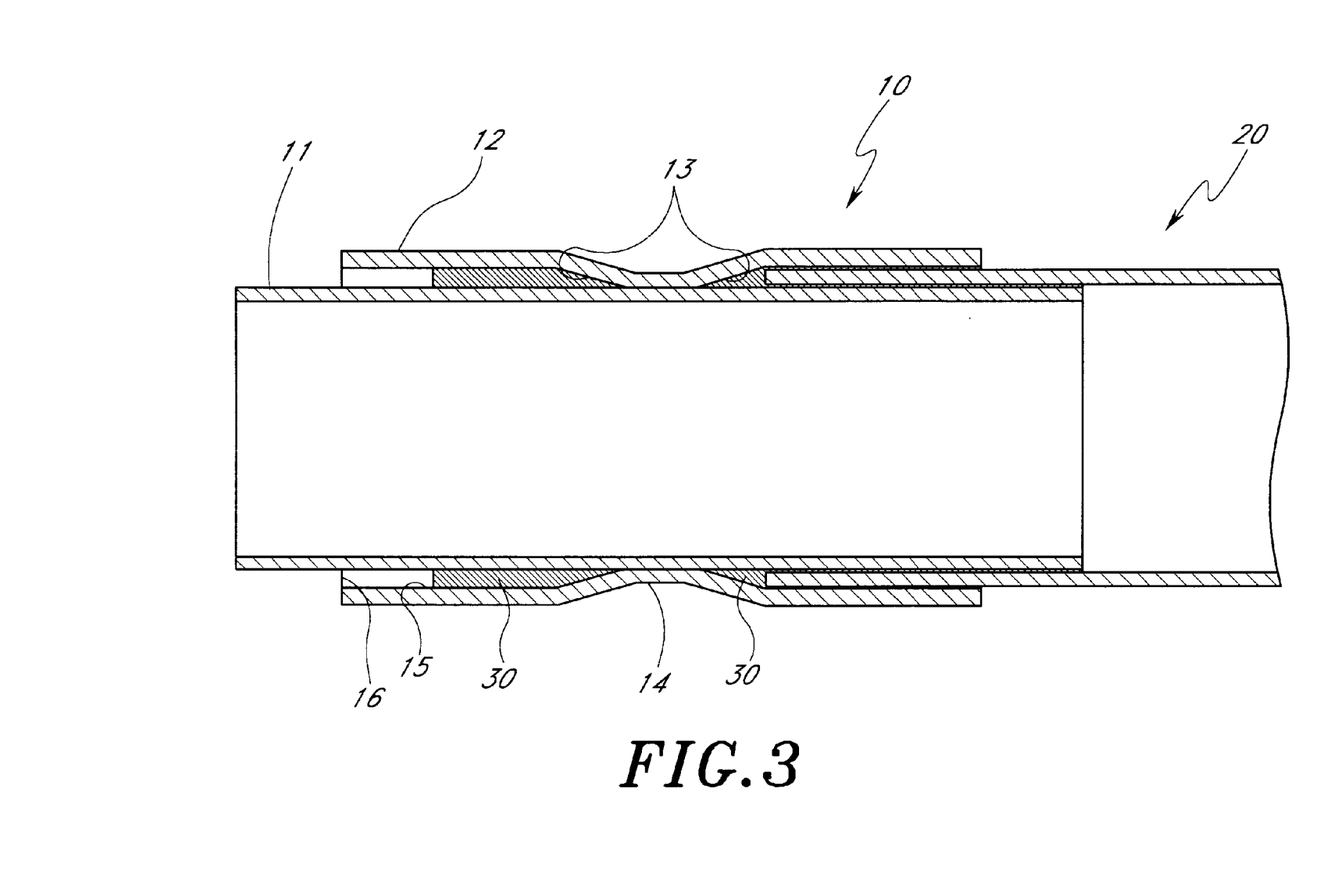
FIG. 3 shows also a cross section of a pipe in the process of connection.

While the tip of the pipe 20 is inserted into the deepest end of the gap 15, if the pipe 20 is strongly pushed in, the outer circumference of the pipe tip is cut into the inner side of the circular tapered surface 13, reducing a gap between the pipe 20 and the tapered surface 13 to a minimum. With this as a trigger, the anaerobic adhesive 30 around the contact position starts hardening. In a short time, the entire anaerobic adhesive 30 inside the gap 15 completely hardens. The pipe 20 and the pipe joint 10 are joined by the anaerobic adhesive 30 and fixed so that they do not shift from each other.

Figure 4:
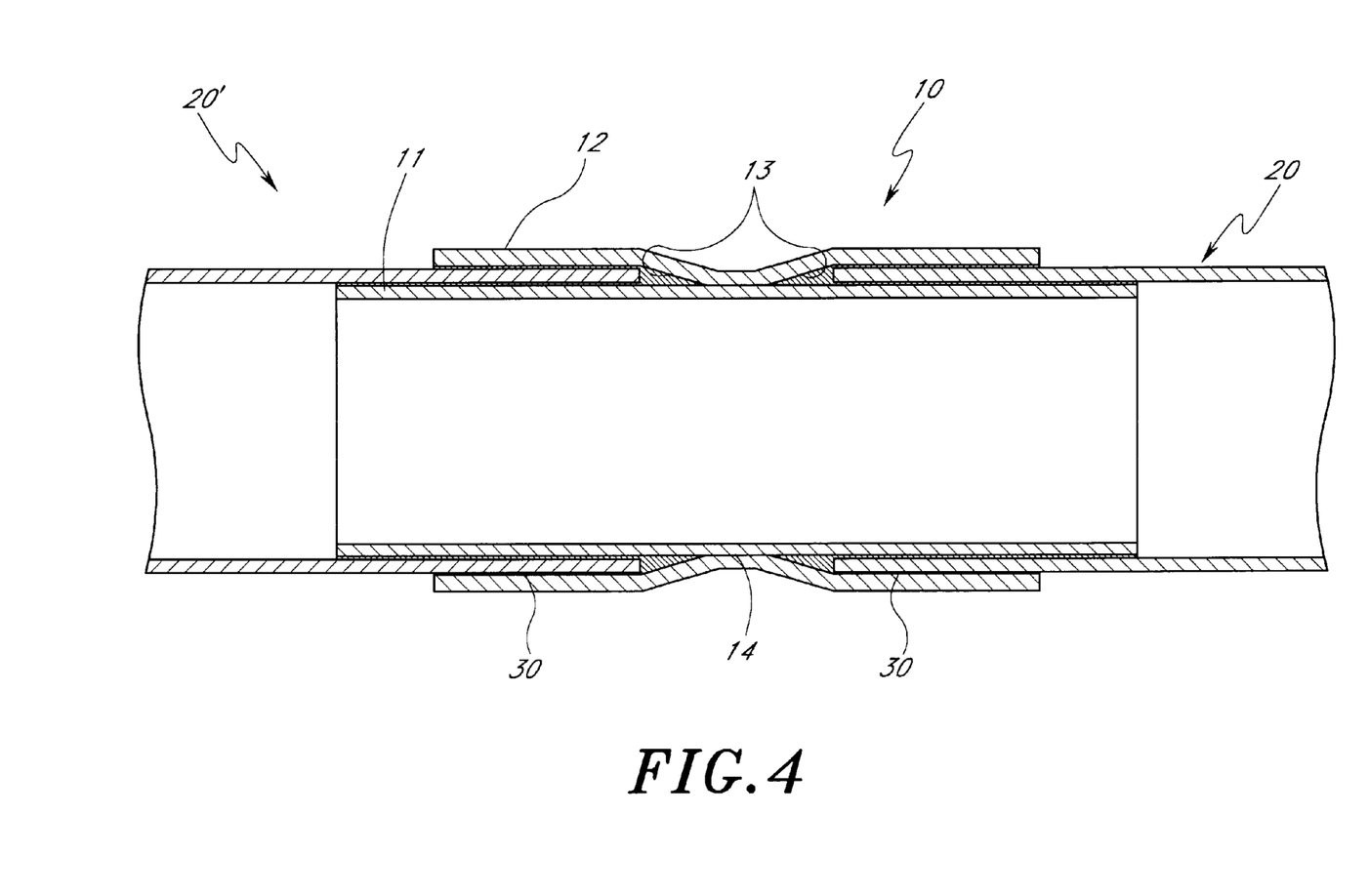
FIG. 4 shows a cross section of a completely connected pipe.

The pipe 20' on the other side is also connected with the pipe joint 10, in the manner as described above, by inserting it inside the gap 15 after a proper amount of the anaerobic adhesive 30 is filled inside the gap 15 of the pipe joint 10 (See FIG. 4.).

Thus, using the pipe joint 10 of this embodiment, only by performing a simple task comprising filling a proper amount of the anaerobic adhesive 30 inside the gap 15 of the pipe joint 10 and inserting the end of the pipe 20 until it contacts the tapered surface 13 inside the gap 15, a pipe connection structure with excellent airtightness and reliability can be achieved.

Embodiment 2

The second embodiment of the present invention possesses a cap 100 with a structure of the pipe joint 10 described in the first embodiment.

Figure 5:
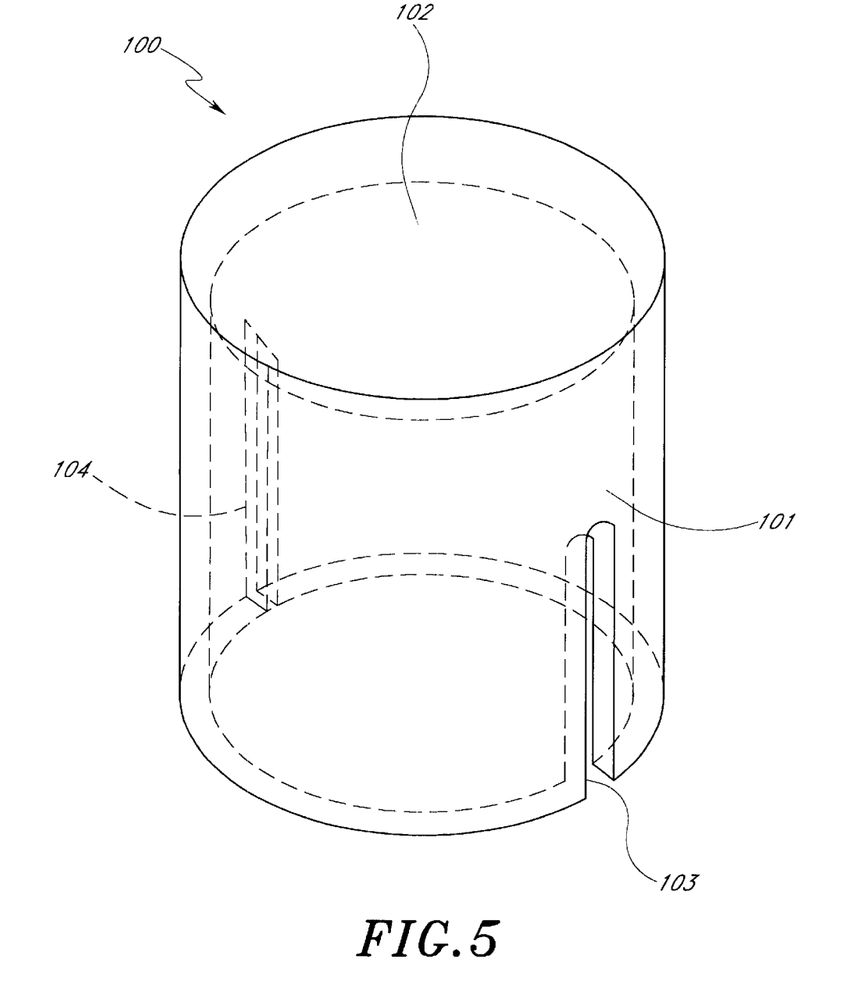
FIG. 5 shows an oblique section of a cap of the second embodiment according to the present invention.

The cap 100 of this embodiment, as shown in FIG. 5, comprises a tube portion 101 to be inserted inside the gap 15 between the inner pipe 11 and the outer pipe 12 of the pipe joint 10 and a lid portion 102 to cover one end of the tube portion 101. It is formed using a plastic material that does not adhere with the anaerobic adhesive 30 used in the first embodiment. In the tube portion 101, an adhesive-filling slit 103 formed from the end of an opening parallel with the center of a shaft, and an air escape slit 104 formed form the end of the opening in an opposed position of the slit 103, are provided. These slits 103 and 104 are formed up to the positions in which the tip of each slit can be exposed from the end of the outer pipe 12, when the cap 100 is attached to the pipe joint 10. The air escape slit 104 is formed with a sufficiently narrow width. The caps 100 are fitted into both ends of the pipe joint 10 in advance, and the pipe joint is handled with the caps 100 on.

Figure 6:
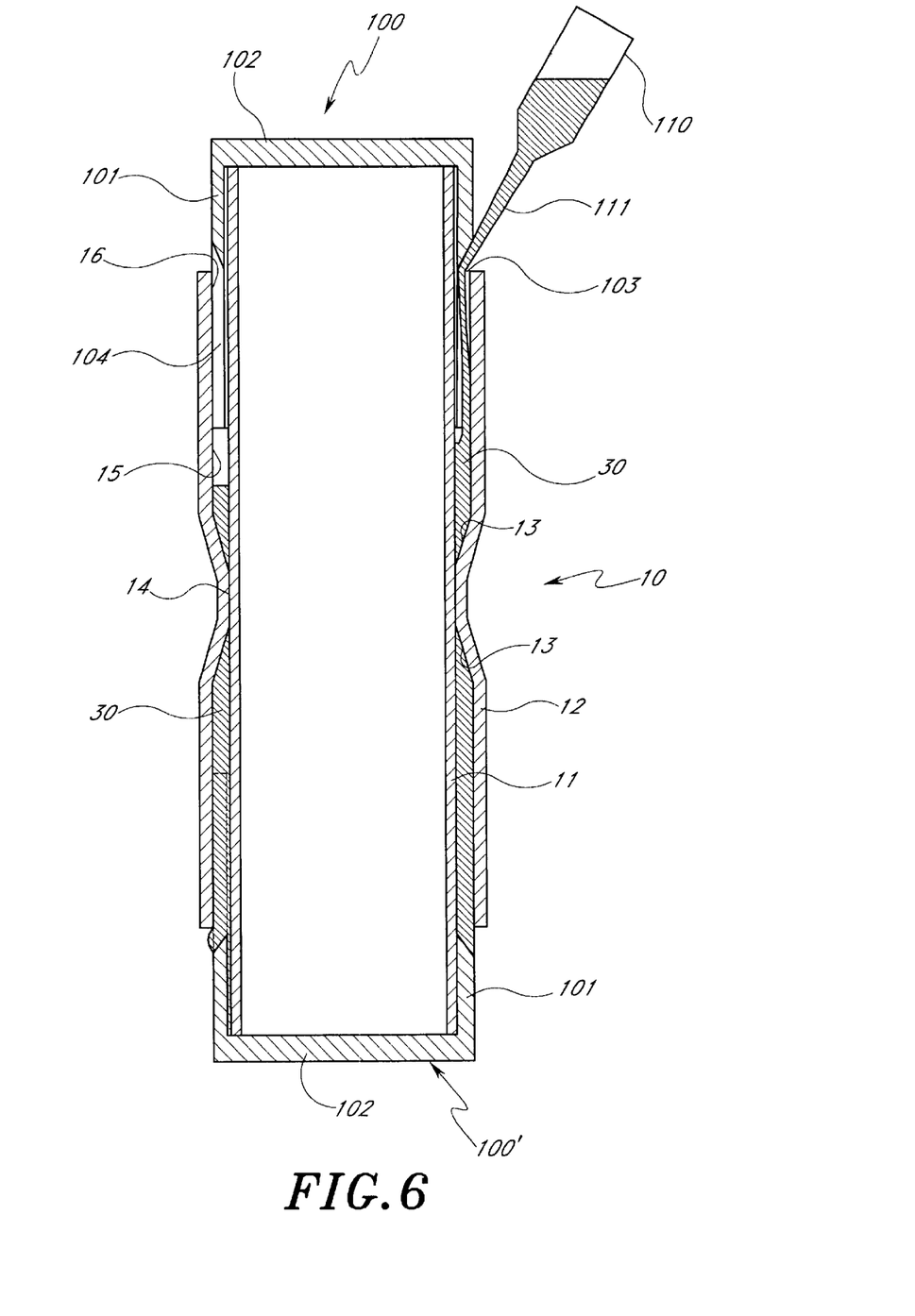
FIG. 6 shows a cross section of a pipe joint to which the cap is attached.

The anaerobic adhesive 30 is filled in the pipe joint 10 of this embodiment, as shown in FIG. 6, by inserting a nozzle 111 of an infuser 110 filled with the anaerobic adhesive 30 in the tip of the slit 103 of the cap 100. The adhesive flows downward and gradually accumulates inside the gap while air inside the gap 15 is forced out from the air escape slit 104. Finally, the adhesive fully fills the gap 15 and excess adhesive begins overflowing from the air escape slit 104. At this point, the worker stops filling the adhesive 30.

Almost simultaneously when overflow of the adhesive 30 from the air escape slit 104 subsides, the adhesive 30 inside the slit 104 starts hardening, because the slit 104 is formed in a narrow width. Hardening progresses gradually and it reaches a state in which the slit 104 is filled up by the adhesive 30 with high viscosity. Hardening of the adhesive 30 in other areas does not progress as rapidly as the adhesive inside the slit 104, because the adhesive is not squeezed in a narrow gap which expedites rapid hardening.

After stopping filling the anaerobic adhesive 30, the worker turns over the pipe joint 10 with the cap 100 on to fill the adhesive 30 in the gap 15 on the opposite side. The adhesive 30 is infused in the same manner described above. In this state, i.e., the air escape slit 104 of the lower cap 100 is filled by the anaerobic adhesive with high viscosity, no such incidents as flowing out of the adhesive 30 and flowing backward of air occur. Because the adhesive-filling slit 103 is filled by the adhesive 30 with slightly higher viscosity as well, the adhesive 30 does not flow out from the slit.

When filling of the adhesive 30 into the gap 15 on both ends is completed, the worker removes both caps 100 and 100' and promptly connects the pipes 20 and 20'. In this case, the adhesive 30 filled inside the gap 15 has not completely hardened, although its viscosity is slightly higher. It, therefore, does not flow out from an opening 16 even if the pipe joint 10 is moved or tilted. When inserting the pipe 20 into the gap 15, the adhesive 30 gradually and thinly spreads out around the opening 16 as if being pushed away by the end of the pipe 20. With the end of the pipe 20 being pushed against a tapered surface 13 as a trigger, hardening of the anaerobic adhesive 30 rapidly progresses starting around the contact position then progressing to the entire area.

Thus, when filling the anaerobic adhesive 30 into the gap 15 using the pipe joint 10 of this embodiment possessing the cap 100, the worker fills the anaerobic adhesive 30 from the adhesive-filling slit 103 and stops filling when the adhesive overflows from the air escape slit 104. This method has excellent workability, since it ensures that a proper amount of the adhesive 30 is filled in the gap of the pipe joint 10. It makes good use of the adhesive, since the pipe 20 and the pipe joint 10 can reliably be joined always with a proper amount to secure the desired adhesion strength as well as to prevent an excess of adhesive.

By forming the air escape slit 104 with a sufficiently narrow width, adhesive overflowing and air backflow can be prevented with the slits 103 and 104 filled by the high-viscosity adhesive 30. With this structure, the adhesive 30 can be filled in both sides of the gap 15 of the pipe joint 10 in a standing position, further improving workability.

Embodiment 3

Figure 7:
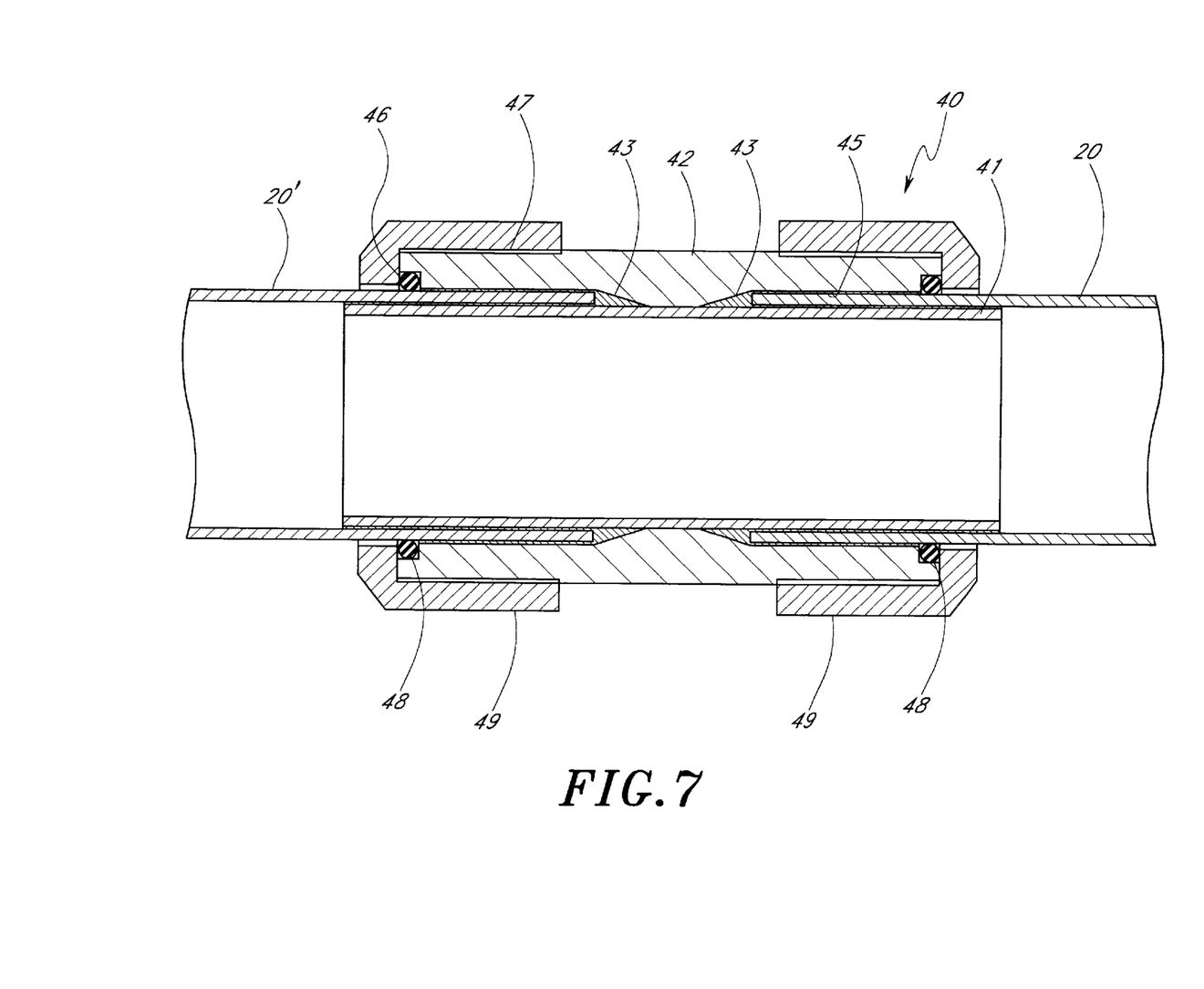
FIG. 7 shows a cross section of a piping connection structure of the third embodiment according to the present invention.

FIG. 7 shows a cross section of a pipe connection structure of the third embodiment of the present invention. This embodiment is also a pipe joint 40 that concentrically connects two cylindrical pipes 20 and 20' with the same diameter. This embodiment is for cases where higher airtightness, pressure resistance and vibration resistance are required.

Similarly to the pipe joint 10 in the first embodiment, the pipe joint 40 is formed using a metal material such as iron. It has a double pipe structure wherein an inner pipe 41 fitting into the inner circumference side of the end of the pipe 20, an outer pipe 42 fitting into the outer circumference side of the end of pipe 20 are overlapped with a gap 45 between them. Different from the first embodiment, the outer pipe 42 is formed by cutting a thick metal cylinder. Specifically, the inner circumference of the outer pipe 42 is formed by hollowing out from both ends which will be opening ends by a measurement equivalent to the width of the gap 45, with the middle portion in the length direction left unchanged. In the end of the processed portion, a tapered surface 43 is formed in the middle portion of the outer pipe 42 in the length direction. The inner circumference wall of the outer pipe 42 and the outer circumference wall of the inner pipe 41 are spliced as one in their middle portion in the length direction by welding. On the inner circumference surface of both openings of the outer pipe 42, an O-ring receiving groove 46 is formed. On the outer circumference surface of both openings of the outer pipe 42, a screw groove 47 is formed.

In the O-ring receiving groove 46, an O-ring 48, e.g., a metal O-ring circularly cut with an edge, is fitted in. The O-ring 48 is fixed by a metal cap nut screwed in the screw groove 47.

When the pipes 20 and 20' are connected using the pipe joint 40 of this embodiment, first, a proper amount of an anaerobic adhesive 30 is filled deep inside the gap 45 (in the middle of the pipe joint 40) from the opening of the gap 45. In this state, the anaerobic adhesive 30 has not hardened because a large portion of it is in contact with air. Next, the end of the pipe 20 is inserted inside the gap 45. The anaerobic adhesive 30 fills inside the gap 45, then gradually thinly spreads out between the pipe 20 and the inner wall of the gap 45 as if being pushed away by the end of the pipe 20. When the tip of the pipe 20 contacts the tapered surface 43 of the outer pipe 42, the anaerobic adhesive 30 is fully filled inside the gap 45 and hardening begins. Shortly, the pipe 20 and the pipe joint 40 are joined with the anaerobic adhesive 30 and fixed so that they do not shift from each other.

Lastly, by fitting the O-ring 48 in the O-ring receiving groove 46 and screwing the cap nut that is put through on the side of the pipe 20 in the screw groove 47 in advance, the O-ring 48 is fixed. At this time, because the O-ring 48 is circular with an edge, tightening force can be exceptionally reduced as compared with conventional methods, improving workability.

Using the pipe joint 40 of this embodiment, fixing the pipe connection portion and sealing inside the piping are doubly achieved by the cap nut 49 and the O-ring 48 as well as the adhesive 30. With this structure, the pressure resistance, vibration resistance and airtightness of the piping can be further strengthened. Consequently, in addition to the effect achieved by the first embodiment, this embodiment has excellent effects. In a spot where high-temperature high-pressure gas needs to be maintained in a completely airtight state for a long period of time or vibration is always present, the adhesive 30 hardly cracks and piping with higher reliability can be achieved.

Other Embodiments

The present invention is not limited to the embodiments described above referring to the figures. For example, embodiments described below are included in the technical scope of the present invention. Furthermore, other than these described below, the present invention can be carried out by modifying it in various ways within limits where its substance is not deviated from.

Figure 8:
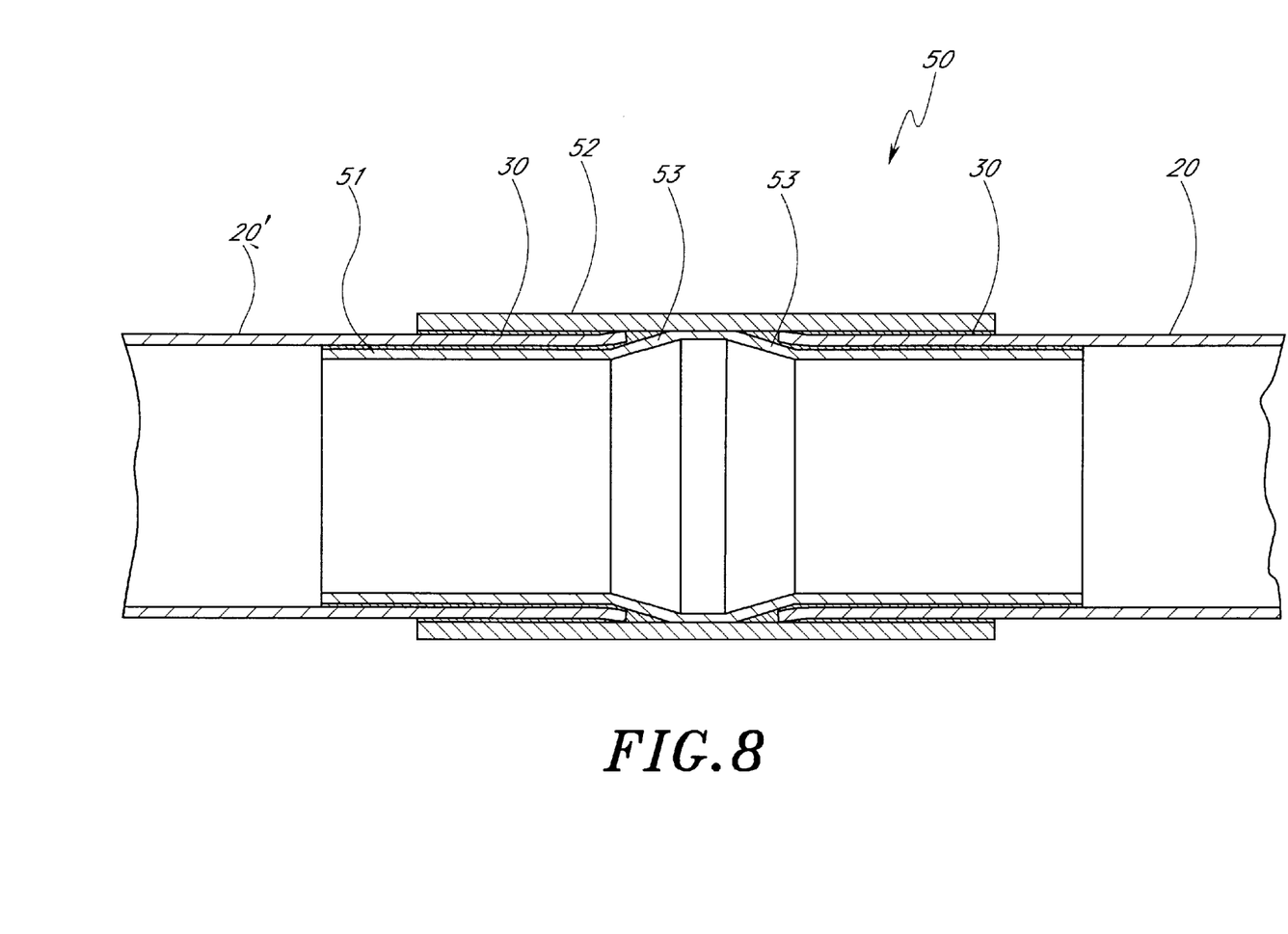
FIG. 8 shows a cross section of a piping connection structure of a different embodiment.

(1) In the above-mentioned embodiments, the tapered surface 13 or 43 is provided on the outer pipe 12 or 42 of the pipe joint 10 or 40. For example, as in a pipe joint 50 shown in FIG. 8, an outer pipe 52 is formed in a cylindrical shape and the tapered surface 53 is formed on the side of an inner pipe 51, approaching the outer pipe 52. Additionally, the tapered surface can be formed in both inner and outer pipes.

Figure 9:
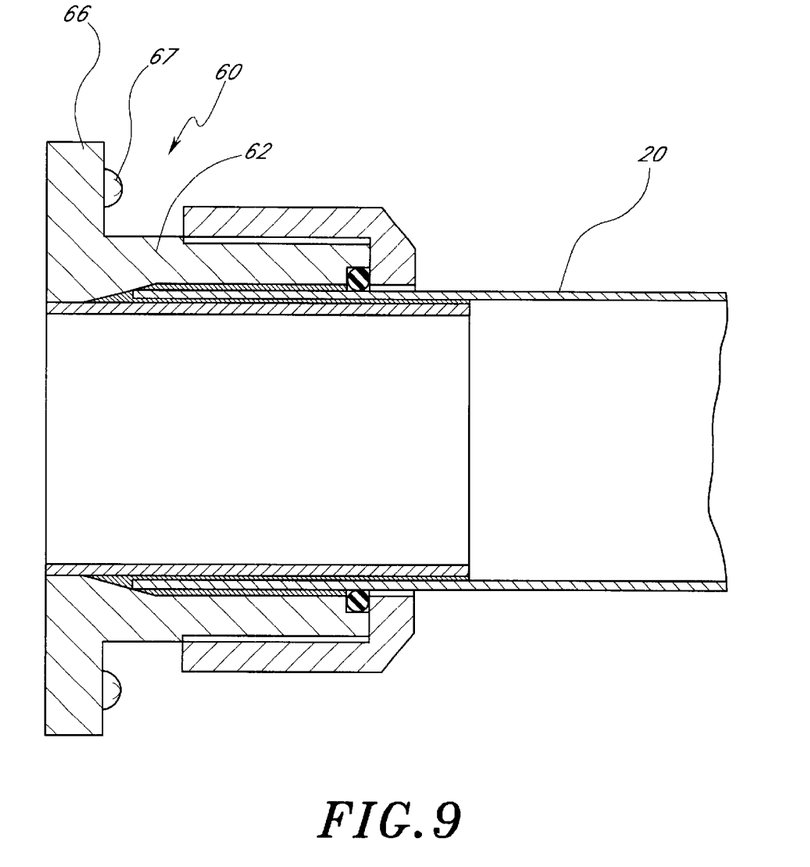
FIG. 9 shows a cross section of a piping connection structure of a different embodiment.

(2) In the above-mentioned embodiments, the pipe joint 10 or 40 is concentrically connected with the pipes 20 and 20'. Not limited to this structure, as shown in FIG. 9, the cylindrical pipe 20 and equipment such as a tank can be directly connected with a joint 60. In this case, by providing a flange 66 on an outer pipe 62 and tightening it with a bolt 67, the joint can be attached to the equipment. It is needless to say that the structure of the joint can be changed to connect two pipes with different diameters.

(3) In the above-mentioned second embodiment, the anaerobic adhesive 30 is filled by standing the pipe joint 10 with the cap 100 attached. Not limited to this, a structure can be changed so as to fill the anaerobic adhesive 30 by laying the joint on its side. In this case, an adhesive-filling slit 103 and an air escape slit 104 can be provided on a tube portion 101, adjacent to each other. The anaerobic adhesive 30 is filled inside the gap 15 from the slit 103 with each slit facing up. A proper amount of the adhesive 30 can be filled inside the gap 15 by stopping the filling immediately when the adhesive 30 starts overflowing from the slit 104.

An Embodiment Using Pleated O-rings

Figure 10A:
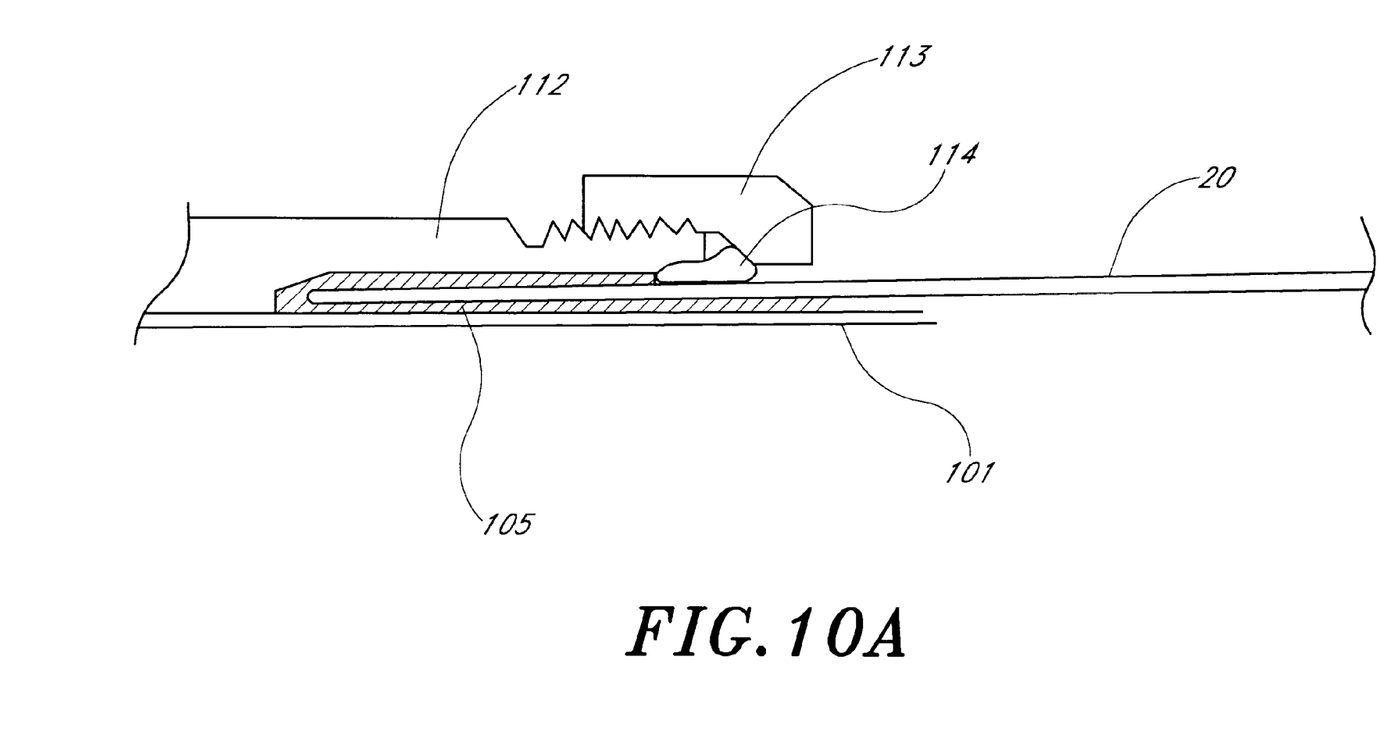
FIG. 10A shows a partial cross section of one example of a piping connection structure using a pleated O-ring.
Figure 10B:
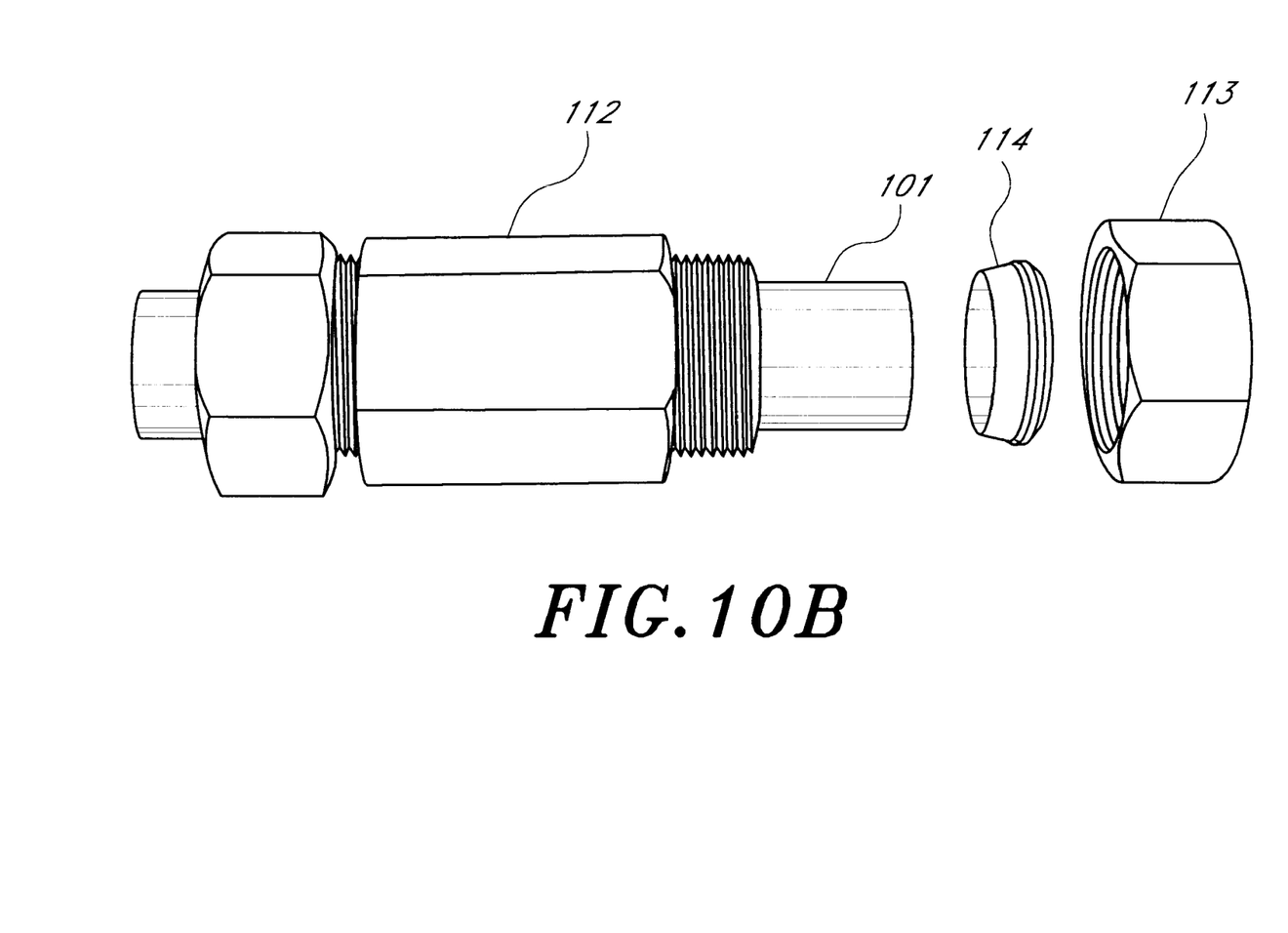
FIG. 10B is a schematic drawing of one example of a piping connection structure using a pleated O-ring.

FIG. 10A and FIG. 10B show an embodiment of a pipe joint using pleated O-rings. In this embodiment, the pipe joint is connected to a copper pipe. An outer pipe (the main body) 112 is precisely processed to form a clearance with the copper pipe, with which an adhesive can achieve the strongest adhesive strength most quickly. Because an O-ring 114 is pleated, the copper pipe 20 to be connected can be securely tightened by lightly tightening a nut 113. With effects multiplied by use of the adhesive, powerful pressure resistance can be exhibited. An adhesive 105 has strong adhesive force with a copper pipe and can achieve a high degree of airtightness. An adhesive with longitudinal shear strength, which displays sufficient pressure resistance without using the O-ring 114, is used. An inner pipe is an important element rendering a non-flame method workable. The inner pipe prevents the adhesive from overflowing inside the piping. By enlarging an adhesion area, pressure resistance is exceptionally improved. At the same time, a high degree of airtightness can be maintained because a passage for a fluid to escape from the piping becomes longer. Additionally, the inner pipe is manufactured thinner than copper pipe to be connected and slightly expands in the centrifugal direction by internal pressure inside the piping. With this, the adhesive always receives the force in the direction of its thickness, and thus airtightness in heat cycles can be improved.

What is claimed is:

1. A pipe joint for airtightly connecting a metal pipe using an adhesive, which is characterized in that a double pipe structure is formed with an inner pipe, which fits into the inner circumference side of the end of said metal pipe, and an outer pipe shorter than the inner pipe, which fits into the outer circumference side of the end of said metal pipe, said inner pipe and said outer pipe being integrated with a gap therebetween, and that a tapered surface is formed with at least one or the other of said inner pipe or outer pipe approaching the other, wherein the pipe joint comprises an O-ring provided between the end of said outer pipe and said pipe, and an O-ring locking material, which is supported by said outer pipe and fixes said O-ring.

2. The pipe joint as claimed in claim 1, wherein said O-ring is a protruding portion in a circular shape extending in the direction of the inner portion of said double structure and comprises a projecting portion to be inserted between the outer circumference of said pipe and the inner circumference of said outer pipe.

3. The pipe joint as claimed in claim 1, wherein said O-ring locking material is screwed on and is supported by said outer pipe.

4. A pipe joint kit which is characterized in that it comprises (1) a pipe joint for airtightly connecting a metal pipe using an adhesive, wherein a double pipe structure is formed with an inner pipe, which fits into the inner circumference side of the end of said metal pipe, and an outer pipe shorter than the inner pipe, which fits into the outer circumference side of the end of said metal pipe, said inner pipe and said outer pipe being integrated with a gap therebetween, and a tapered surface is formed with at least one or the other of said inner pipe or outer pipe approaching the other, (2) an anaerobic adhesive for joining a pipe and said pipe joint, and (3) a cap comprising a tube portion to be inserted between said gap provided between said inner pipe and said outer pipe when the adhesive is filled, a lid portion covering one end of the tube portion, an adhesive-filling slit formed on said tube portion and linked to said gap, and an air escape slit formed on said tube portion and linked to said gap.

5. The pipe joint as claimed in claim 4, wherein said O-ring is a protruding portion in a circular shape extending in the direction of inner side of said double structure and comprises a protruding portion to be inserted between the outer circumference of said pipe and the inner circumference of said outer pipe.

6. A pipe joint kit which is characterized by being used for airtightly connecting a metal pipe using an adhesive and by comprising (1) a main body with a double pipe structure formed with an inner pipe fitting in the inner circumference side of the end of said pipe and an outer pipe fitting in the outer circumference side of the end of said pipe, which is shorter than the inner pipe, integrated with a gap between the inner pipe and the outer pipe, (2) O-rings each of which is provided between the end of said outer pipe and said pipe, and (3) O-ring locking materials, which are supported by said outer pipe and fix said O-ring.

7. The pipe joint as claimed in claim 6, which is used for copper piping.

8. The pipe joint as claimed in claim 6, wherein said O-ring locking material is screwed on and is supported by said outer pipe.

9. A pipe joint kit, which is characterized in that a pipe joint as claimed in claim 6, and an anaerobic adhesive for joining a pipe and said pipe joint are combined.

10. A pipe connection structure, wherein a metal pipe is inserted in a gap between an inner pipe portion and an outer pipe portion from one end of a pipe joint having a double structure formed with the inner pipe portion and the outer pipe portion, said outer pipe portion being shorter than the inner pipe portion:

wherein said inner pipe portion and said outer pipe portion are fixed and integrated; said gap has a shape such that said metal pipe is fitted in, when the end of said metal pipe reaches an integrating portion of said inner pipe portion and said outer pipe portion; and an adhesive is filled in a gap formed between the end of said metal pipe fitted in the double structure and said inner pipe portion and said outer pipe portion; the metal pipe is connected to said pipe joint in an airtight state, wherein an O-ring is provided a t the end of said outer pipe portion and between said outer pipe portion and said pipe, and said pipe is further fixed by pushing said O-ring inside said double structure using an O-ring locking material supported by said outer pipe portion.

11. The pipe connection structure as claimed in claim 10, wherein a protruding portion in a circular shape extending in the direction of the inner side of said double structure is provided on said O-ring, and said O-ring is fixed in a state where said protruding portion is inserted between the outer circumference portion of said pipe and the inner circumference portion of said out pipe portion.

12. The pipe connection structure as claimed in claim 10, wherein said O-ring locking material is screwed on and is supported by said outer pipe portion.

* * * * *